Sept. 13, 1927.
W. G. HOUSKEEPER
1,642,498
ELECTRON DISCHARGE DEVICE
Filed Oct. 30, 1922
Fig.1 Fig.2 Fig.3 Fig.4
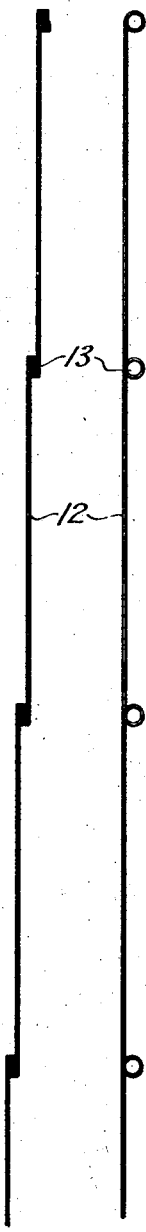
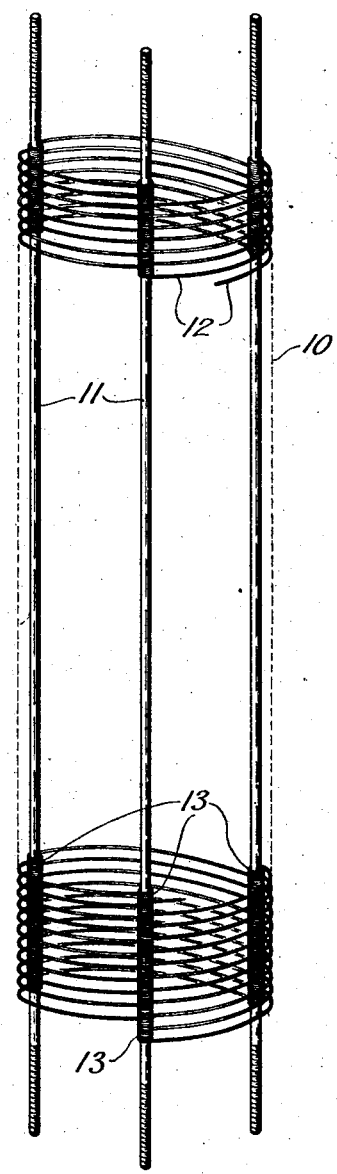
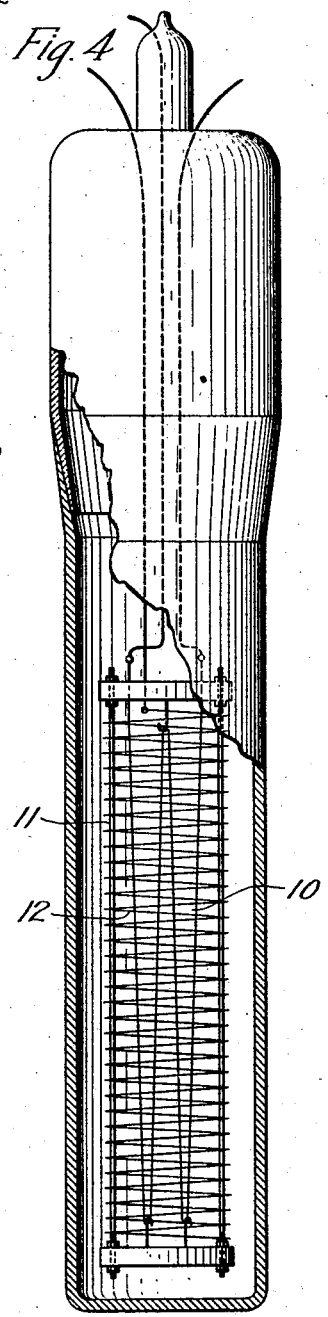
Inventor:-
William G. Houskeeper.
by  Atty.

Patented Sept. 13, 1927.

1,642,498

UNITED STATES PATENT OFFICE.

WILLIAM G. HOUSKEEPER, OF NEW YORK, N. Y., ASSIGNOR TO WESTERN ELECTRIC COMPANY, INCORPORATED, OF NEW YORK, N. Y., A CORPORATION OF NEW YORK.

ELECTRON-DISCHARGE DEVICE.

Application filed October 30, 1922. Serial No. 597,747.

This invention relates to electron discharge devices and pertains especially to the electrode structure thereof, and its object is an improved grid structure wherein the lateral wires are supported in proper space relation on the frame members in a simple structural arrangement which can be manufactured without the use of welding operations or the like.

According to this invention, these objects are attained by forming coils at intervals along a length of wire and slipping the successive coils over one or more frame members in rotation to form a grid structure, the operations being continued until a structure of the desired length has been formed. The coils in the wire forming the grid serve to fasten it to the frame members and also insure accurate and uniform spacing of adjacent lateral members. An advantage of this structure lies in the fact that no welding operations are necessary.

Referring now to the drawings, Fig. 1 discloses the wire of which the grid is to be formed, said wire having formed therein coils at regular intervals. Fig. 2 is a side view of Fig. 1. Fig. 3 discloses the completed grid, the middle portion being broken away; and Fig. 4 discloses an electron discharge device equipped with a grid made in accordance with this invention.

The grid comprises a wire helix 10 which is supported by a plurality of frame members 11, in this instance, three. The wire 12 of which the helix is formed is provided at regular intervals with coils 13 having a relatively small number of turns, for example, two or three. The successive coils 13 embrace the successive frame members in rotation thus forming a substantially cylindrical electrode. The coils 13 serve to space the adjacent turns and also attach the helix 11 to the frame members thus avoiding any welding operations.

In manufacturing the above described grid, a length of wire 12 is first provided with the coils 13 at predetermined intervals as shown in Figs. 1 and 2. The first coil 13 is then slipped over the end of one frame member, the second coil is passed over the end of the second frame member and the third coil over the end of the third frame member, after which the fourth coil is passed over the end of the first frame member and brought into contact with the first coil. This operation is continued and the coils are pushed along the frame members until a helix of the desired length has been obtained. The electrode is then assembled with a pair of insulating blocks and placed within the vacuum tube as shown in Fig. 4, the ends of the frame members passing through apertures in the blocks and being attached thereto by nuts as disclosed in my copending application Serial No. 578,292, filed July 29, 1922, sleeves or coils of wire being arranged between the end coils on each frame member and the insulating block to properly position the grid and keep the coils in contact.

The invention claimed is:

1. In combination, a frame member, a wire helix supported thereby, and means for attaching said helix to said frame member comprising a coil in each turn of the helix, each coil surrounding said frame member.

2. In combination, a plurality of frame members, and a wire helix surrounding said frame members, said helix being provided at regular intervals with coils surrounding said frame members.

3. In combination, a plurality of frame members, a wire helix supported thereby, and means for spacing the adjacent turns of said helix comprising portions of the wire forming said helix.

4. In combination, a plurality of frame members, and a wire helix having portions surrounding said frame members, said portions serving to attach said helix to said frame members and to space the adjacent turns of said helix.

5. In combination, a plurality of frame members, a plurality of lateral wires, and means for attaching said lateral wires to said frame members comprising coils in each of said lateral members, said coils surrounding said frame members.

6. A grid electrode for an electron discharge device comprising a frame member, a wire helix supported thereby, and means integral with said helix surrounding said member to space adjacent turns of said helix.

7. A grid electrode for an electron discharge device comprising a plurality of frame members, a continuous wire helix supported thereby, and means integral with said helix surrounding each member to space adjacent turns of said helix.

In witness whereof, I hereunto subscribe my name this 27th day of October A. D. 1922.

WILLIAM G. HOUSKEEPER.